April 9, 1935.  
M. ADAMCIKAS, (ALSO KNOWN AS M. ADAMTCHIK) ET AL  
1,997,506  
GUIDE VANE FOR ROTARY MACHINES  
Filed Sept. 24, 1931 2 Sheets-Sheet 2

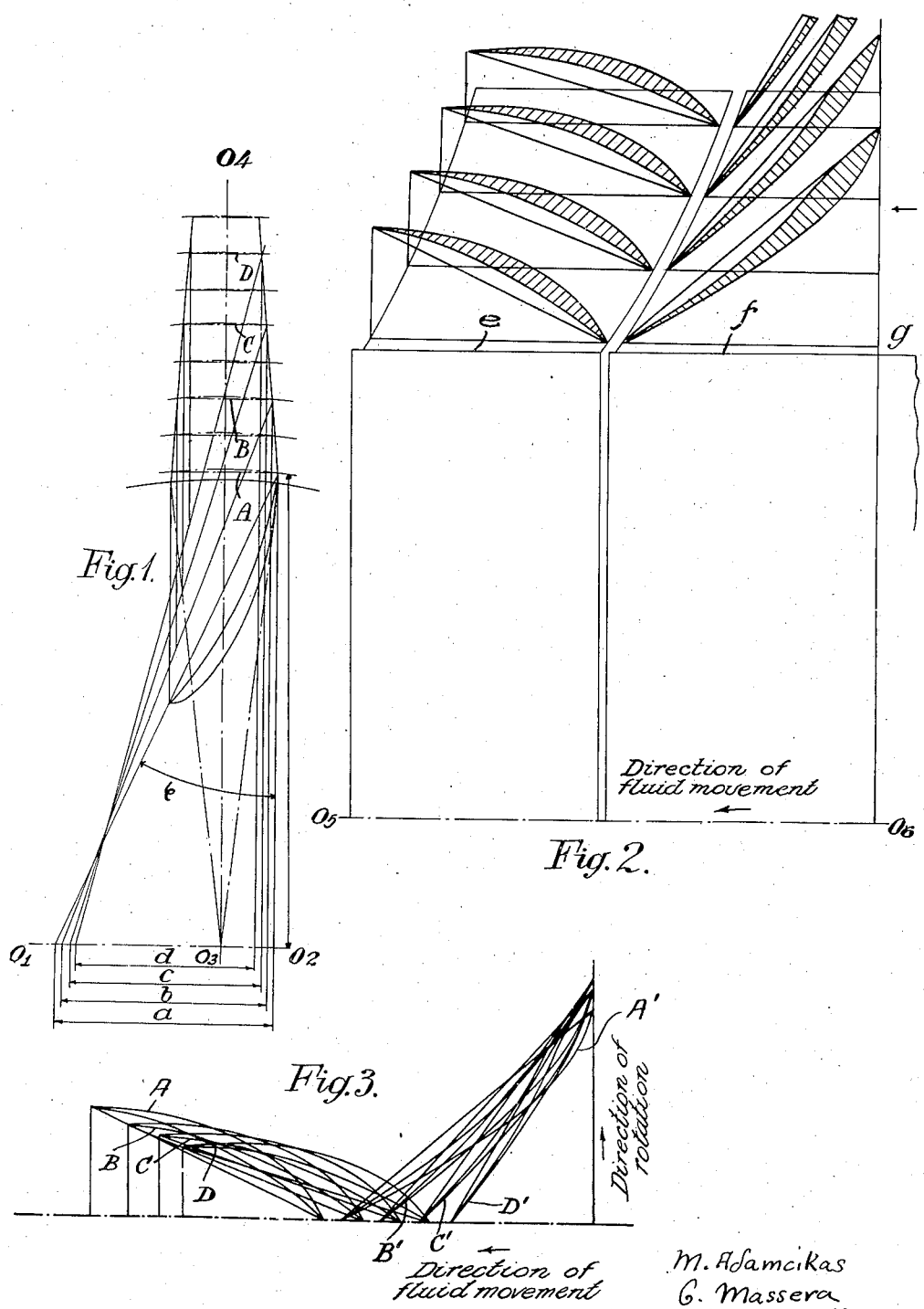

M. Adamcikas  
G. Massera  
INVENTORS

By: Marks & Clerk  
Attys.

Patented Apr. 9, 1935

1,997,506

UNITED STATES PATENT OFFICE 1,997,506

GUIDE VANE FOR ROTARY MACHINES

Mykas Adamčikas (also known as Michael Adamtchik) and Giuseppe Massera, London, England Application September 24, 1931, Serial No. 564,923
In Great Britain September 29, 1930

1 Claim. (Cl. 230—120)

This invention relates to the construction of rotary screw machines with guide vanes, and more particularly of screw machines for the propulsion of fluids in conduits.

The great drawback of the present constructions of guide vanes is the lack of self-adaptability to the changing conditions of work and various complicated constructions have been proposed to avoid this drawback.

Self-adaptability of the guide vanes to the changing conditions of work can be ensured only when use is made of a rotor working at a uniform pressure along the whole working area, such as described in our Patent No. 1,831,729, according to which the width and geometrical pitch of the pressure side of the blade gradually increase towards the hub in such a way that the width and geometrical pitch are at their maximum for the cross-section of the blade lying on the hub itself. With such uniform pressure the ratio of speed of rotation to the velocity of the axial flow is constant.

It is well known that in all rotary screw machines the fluid is caused to rotate due to the fact that absolute velocities at outflow are directed at acute angles to the axis. The rotational energy of outflow is a considerable loss of useful work and guide vanes are used in rotary screw machines in order to stop rotation and to transfer rotational energy of outflow into useful work. It is usual practice to so construct the guide vanes that the angles of pitch of the leading edge towards the axis coincides with the direction of the absolute velocity of the outflow from the rotating blades and to use a large number of guide vanes in order to divide the fluid into small streams directed by the vanes. In this case the angles of pitch of the leading edge gradually change into the axial direction towards the trailing edge.

The purpose of the guide vanes in a rotary screw machine is to stop and recover the rotational momentum in the outflow of such a machine and in the same way as a moving glider uses the wind energy for lifting purposes, the stationary guiding vanes of a rotary screw machine counteract the rotational momentum and redirect the flow along the axis.

The use of aerofoils for this purpose allows the width of the vanes to be greatly decreased owing to the much higher obtainable coefficients of the lift. In this case by directing the blades under certain angles (angles of attack) towards the absolute velocities of the outflow, a much larger lifting power of the vanes can be obtained, and their dimensions can be further reduced.

In our Patent No. 1,831,729 above referred to, it was explained that in the case of rotary screw machines with uniform pressure, the speed of rotation of the outflow gradually increases towards the hub. This means that the angles of inclination of the absolute velocities of the outflow with respect to the axial direction increase quickly towards the hub.

If we imagine several cylinders coaxial with guide vane apparatus, the said cylinders having diameters increasing by steps from the hub to the tips,—we will obtain a series of cylindrical guide vane cross sections, which we will refer henceforth as "vane sections". The directions of the tangents to the concave side of vane section are placed under acute angles to the direction of the axis, and these angles we call the angles of vane inclination with respect to the axis.

Theoretical considerations and experimental investigations have led us to a construction of guide vanes by which we obtain a maximum efficiency for the conversion of the rotational velocity into useful pressure.

This result is ensured according to the present invention by constructing the guide vanes with a geometrical pitch, considered with respect to the axial direction, which increases gradually towards the hub, the section of the vane lying on the supporting hub or drum itself having the maximum geometrical pitch. This construction of guide vanes is more particularly employed with a rotor such as described in our U. S. patent above referred to.

We wish it to be understood that by "geometrical pitch" we do not mean the "angle of pitch" or what is generally understood by "pitch", but the particular pitch which is defined by the formula $2\pi r \tan \theta$, wherein $r$ is the distance of the section of the vane from the axis of rotation of the machine, viz, of the drum to which the vanes are secured and the axis of which coincides with that of the rotor, and $\theta$ is the angle of vane inclination with respect to the axial direction.

It is to be understood that the physical dimension of the geometrical pitch is the measure of advance made by the vane section in the plane normal to the direction of fluid movement if vane section makes one turn around the axis of fluid movement without slip.

In order to simplify the construction, the vanes may be made of the same section along their whole length. It is, however, to be understood that they may also be made with sections of different widths and shapes, provided each element of the vane can overcome the corresponding part of the rotational momentum.

The guide vane apparatus is preferably so arranged with respect to the rotor, that the leading edge of the guide vanes lies in close proximity to the trailing edge of the rotor blades in order to avoid any possible turbulence at the entrance of the guides.

The construction according to this invention allows guide vanes extending over a short distance in the axial direction to be used, which renders possible the construction of multi-stage fans of short extension in the axial direction and thus the use for all steps of vanes having the same shape and dimensions.

Referring to the accompanying drawings, which illustrate the invention,

Figure 1 is a front view of the guide vanes with cross-sections thereof (A, B, C, D), Fig. 2 is a side view of the guide vane and propeller blade, the top part of the figure being a diagram and showing a succession of cross sections of the guide vane and propeller blade on the planes A, B, C, D, indicated in Fig. 1.

Fig. 3 is a projection of the cross sections of the vane and blade indicated at the top of Fig. 2.

Referring to Figure 1, the continuation of the chords of the vanes cross-sections A, B, C, D are developed on the axial plane cut of the axis $O_3O_4$ which is the intersection of the plane of rotation with the plane of drawing, and the lengths $a, b, c, d$, which are proportional to the geometrical pitch $2\pi r \tan \theta$, are equal to $r \tan \theta$, and are considered with respect to the direction of air movement, shown by the axis $O_1O_2$.

Angle $\theta$ and radius $r$ are shown as example for bottom vane section A on Fig. 1.

The maximum value of the geometrical pitch corresponds to the section A lying on the hub itself.

Referring to Figure 2, $O_5O_6$ being a direction of air flow, the outline of the hubs of the guide vanes $e$ forms a continuous line or curve with the outline of the propeller hub $f$ and hub fairing $g$.

Referring to Figure 3, the same shows the relative position of the guide vane sections A, B, C, D and corresponding propeller sections A', B', C' and D'.

Figure 4:
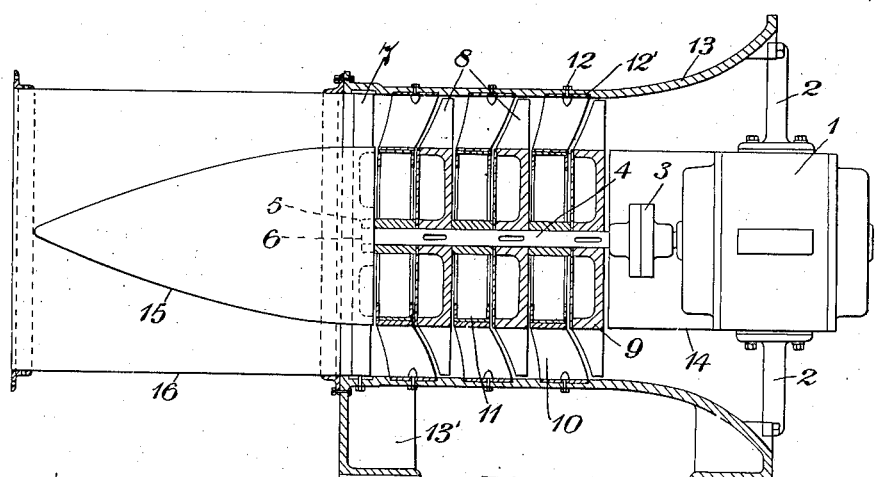
Figure 4 is a side elevation, partly in section, of a three-stage fan, whilst
Figure 5:
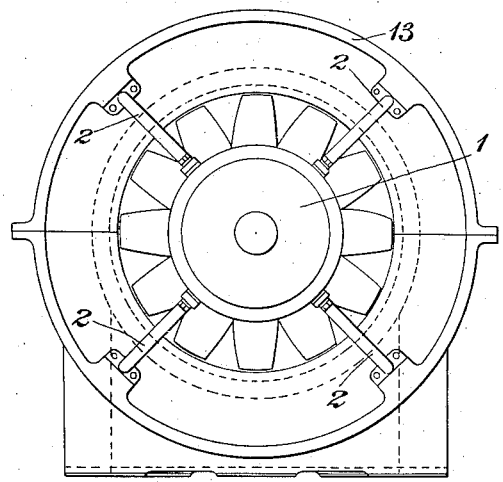
Figure 5 is a front elevation thereof.

Referring to Figures 4 and 5, the same incorporate the application of the new guide vanes in a propeller blade arrangement as described in Patent No. 1,831,729. In these figures, 1 is an electric motor or other prime mover, which is supported by means of supports 2 in a casing 13. The shaft 4 of the fan is connected to the motor 1 by means of a coupling 3, 5 being the ball bearings and 6 the ball bearing housing. The propeller blades 8 are constructed with sections similar to those shown on the right side of Fig. 3 and they are carried on the shaft 4 by means of hubs 9. The guide vanes 10 are constructed with section similar to those on the left side of Fig. 3 and they are mounted on hubs 11, being attached to the casing 13 by means of bolts 12 and guide vane shrouds 12'. The casing 13 is made in two halves, being supported on suitable supports 13'. 14 is a motor fairing and 15 a fan fairing which is supported within the casing 13 by means of supports 7. 16 is a diffuser.

The details for carrying the invention into effect may be modified without in any way departing from the spirit of the invention.

Having now described our invention, what we claim as new and desire to secure by Letters Patent is:—

A fan or other screw propeller for propelling a fluid, comprising a conduit through which the fluid is to be propelled, a rotor having propeller blades within the said conduit, stationary guide vanes facing the said propeller blades and arranged on the outflow side with respect to the said blades and a hub on which the guide vanes are mounted, the said guide vanes being of aerofoil cross-section and their geometrical pitch ($2\pi r \tan \theta$) considered with respect to the axial direction varying towards the hub and being a maximum for the sections lying on the hub on which the guide vanes are mounted, said propeller blades having a width and geometrical pitch in the pressure side which gradually increases toward the hub, both being a maximum for the cross section of the blade lying on the hub of the blades.

MYKAS ADAMČIKAS.
GIUSEPPE MASSERA.